(12) United States Patent
Lin

(10) Patent No.: US 12,525,151 B2
(45) Date of Patent: Jan. 13, 2026

(54) ELECTRONIC DEVICE

(71) Applicant: VIVO MOBILE COMMUNICATION CO., LTD., Dongguan (CN)

(72) Inventor: Ruhao Lin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 204 days.

(21) Appl. No.: 17/952,405

(22) Filed: Sep. 26, 2022

(65) Prior Publication Data

US 2023/0016509 A1   Jan. 19, 2023

Related U.S. Application Data

(63) Continuation of application No. PCT/CN2021/083211, filed on Mar. 26, 2021.

(30) Foreign Application Priority Data

Mar. 27, 2020 (CN) .......................... 202010229372.7

(51) Int. Cl.
*G09F 9/30* (2006.01)
*G06F 3/0488* (2022.01)

(52) U.S. Cl.
CPC ............ *G09F 9/301* (2013.01); *G06F 3/0488* (2013.01)

(58) Field of Classification Search
CPC ...... G09F 9/301; G06F 3/0488; G06F 1/1626; G06F 1/1643; G06F 1/1652;
(Continued)

(56) References Cited

U.S. PATENT DOCUMENTS

| 10,531,054 B2* | 1/2020 | Jeong ..................... G06F 1/1652 |
| 2016/0209876 A1* | 7/2016 | Park ...................... G06F 1/1652 |

(Continued)

FOREIGN PATENT DOCUMENTS

| CN | 206893461 U | 1/2018 |
| CN | 108170355 A | 6/2018 |

(Continued)

OTHER PUBLICATIONS

International Search Report issued in corresponding International Application No. PCT/CN2021/083211, mailed Jun. 17, 2021, 6 pages.
(Continued)

*Primary Examiner* — Allen L Parker
*Assistant Examiner* — Keon Kim
(74) *Attorney, Agent, or Firm* — IPX PLLC

(57) ABSTRACT

An electronic device is provided. The electronic device includes a curved screen, a housing that matches the curved screen to form an accommodating cavity, and a first button. The curved screen includes a plane portion and a curved portion. A first end of the curved portion is connected to the plane portion. The curved portion bends and extends toward the housing. A second end of the curved portion extends toward the accommodating cavity. The first button includes a pressure sensor and a trigger assembly. The pressure sensor is disposed in the accommodating cavity, the trigger assembly is disposed at the second end of the curved portion, and the trigger assembly and the pressure sensor are disposed at an interval. In a case that the curved portion receives a target pressing operation, the second end of the curved portion drives the trigger assembly to contact and trigger the pressure sensor.

8 Claims, 2 Drawing Sheets

(58) Field of Classification Search
CPC ............... G06F 1/1671; G06F 3/04886; G06F 3/0487; H04M 1/0269; H04M 1/236; H05K 5/0017; H01H 13/14
See application file for complete search history.

(56) References Cited

U.S. PATENT DOCUMENTS

| | | | |
|---|---|---|---|
| 2017/0094039 A1 | 3/2017 | Lu | |
| 2018/0164938 A1* | 6/2018 | Li | G06F 3/02 |
| 2018/0183912 A1* | 6/2018 | Lim | G06F 1/1652 |
| 2020/0042125 A1 | 2/2020 | Lee et al. | |
| 2020/0057523 A1* | 2/2020 | Park | G06F 3/041 |

FOREIGN PATENT DOCUMENTS

| | | | | |
|---|---|---|---|---|
| CN | 208572193 U | | 3/2019 | |
| CN | 109782944 A | | 5/2019 | |
| CN | 110022391 A | | 7/2019 | |
| CN | 110100428 A | | 8/2019 | |
| CN | 110174961 A | * | 8/2019 | ........... G06F 1/1684 |
| CN | 110401734 A | | 11/2019 | |
| CN | 110417941 A | | 11/2019 | |
| CN | 110673757 A | | 1/2020 | |
| CN | 210075346 U | | 2/2020 | |
| CN | 110913041 A | | 3/2020 | |
| CN | 111447761 A | | 7/2020 | |
| WO | 2016036396 A1 | | 3/2016 | |

OTHER PUBLICATIONS

First Office Action issued in related Chinese Application No. 202010229372.7 mailed Dec. 29, 2020, 8 pages.
Extended European Search Report issued in related European Application No. 21775549.5, mailed Aug. 17, 2023, 11 pages.

* cited by examiner

ELECTRONIC DEVICE

CROSS-REFERENCE TO RELATED APPLICATIONS

This application is a continuation of International Application No. PCT/CN2021/083211, filed Mar. 26, 2021, which claims priority to Chinese Patent Application No. 202010229372.7, filed Mar. 27, 2020. The entire contents of each of the above-referenced applications are expressly incorporated herein by reference.

TECHNICAL FIELD

The present disclosure relates to the field of electronic technologies, and in particular to an electronic device.

BACKGROUND

A curved screen is installed for an electronic device in the related art. To ensure a display effect of side edges of the curved screen, physical function buttons (such as a volume adjustment button and a power button) originally set on the electronic device are usually changed to virtual buttons displayed on the side edges of the curved screen. Therefore, a screen area can occupy the side edges of the electronic device and even extend to a back of the electronic device. However, since the virtual buttons may be operated mistakenly during use, the electronic device may be turned off mistakenly.

It can be seen that a current problem is that a high mistaken touch rate for virtual buttons occurs in the electronic device provided with the curved screen.

SUMMARY

Embodiments of the present disclosure provide an electronic device.

An embodiment of the present disclosure provides an electronic device, including a curved screen and a housing, where the curved screen and the housing match to form an accommodating cavity, the curved screen includes a plane portion and a curved portion, where a first end of the curved portion is connected to the plane portion, and the curved portion bends and extends toward the housing, in a cross section perpendicular to the plane portion and the curved portion, a second end of the curved portion extends toward the accommodating cavity, and the electronic device further includes a first button, where the first button includes a pressure sensor and a trigger assembly, the pressure sensor is disposed in the accommodating cavity, the trigger assembly is disposed at the second end of the curved portion, and the trigger assembly and the pressure sensor are disposed at an interval, where in a case that the curved portion receives a target pressing operation, the second end of the curved portion drives the trigger assembly to contact the pressure sensor, thereby triggering the pressure sensor.

In an embodiment of the present disclosure, the electronic device includes a curved screen and a housing, where the curved screen and the housing match to form an accommodating cavity, the curved screen includes a plane portion and a curved portion, where a first end of the curved portion is connected to the plane portion, and the curved portion bends and extends toward the housing, in a cross section perpendicular to the plane portion and the curved portion, a second end of the curved portion extends toward the accommodating cavity, and the electronic device further includes a first button, where the first button includes a pressure sensor and a trigger assembly, the pressure sensor is disposed in the accommodating cavity, the trigger assembly is disposed at the second end of the curved portion, and the trigger assembly and the pressure sensor are disposed at an interval, where in a case that the curved portion receives a target pressing operation, the second end of the curved portion drives the trigger assembly to contact the pressure sensor, thereby triggering the pressure sensor. This way, by setting a physical button in the electronic device, and a function of the physical button is triggered when the curved portion of the curved screen is pressed. Compared with setting a virtual button, a mistaken touch rate can be effectively reduced by setting the physical button.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
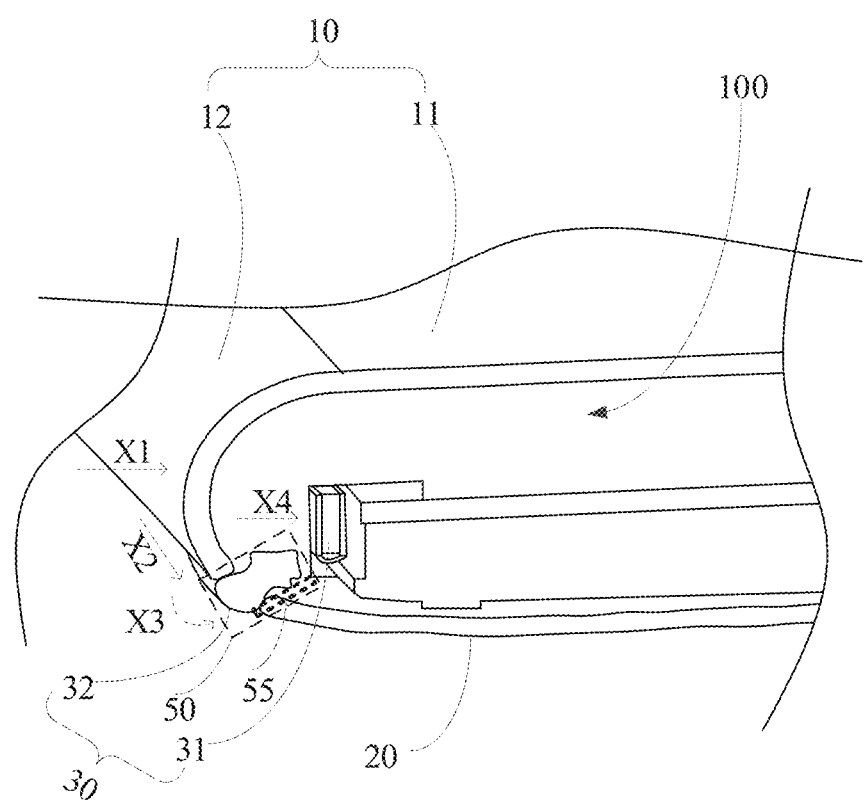
FIG. 1 is a first partial schematic structural diagram of an electronic device according to an embodiment of the present disclosure.

Referring to FIG. 1, an embodiment provides an electronic device, including a curved screen 10 and a housing 20. The curved screen 10 and the housing 20 match to form an accommodating cavity 100. The curved screen 10 includes a plane portion 11 and a curved portion 12. A first end of the curved portion 12 is connected to the plane portion 11, and the curved portion 12 bends and extends toward the housing 20. In a cross section perpendicular to the plane portion 11 and the curved portion 12, a second end of the curved portion 12 extends toward the accommodating cavity 100. The electronic device further includes a first button 30, and the first button 30 includes a pressure sensor 31 and a trigger assembly 32. The pressure sensor 31 is disposed in the accommodating cavity 100, the trigger assembly 32 is disposed at the second end of the curved portion 12, and the pressure sensor 31 and the trigger assembly 32 are disposed at an interval.

The curved portion 12 moves when receiving a target pressing operation, and the second end of the curved portion 12 drives the trigger assembly 32 to contact the pressure sensor 31, thereby triggering the pressure sensor 31.

Here, by setting a physical button (that is, the first button 30) in the electronic device, and a function of the physical button is triggered when the curved portion 12 of the curved screen 10 is subject to a pressing operation. Compared with setting a virtual button, a mistaken touch rate for the electronic device can be effectively reduced by setting the physical button.

It should be noted that the electronic device may be any device provided with the curved screen 10, for example, the electronic device may be a mobile phone, a tablet personal computer, a laptop computer, a personal digital assistant (PDA), a mobile Internet device (MID), a wearable device, or another mobile terminal, and may further be other electronic devices, such as a digital camera, an e-book, or a navigator.

In this embodiment, the plane portion 11 of the curved screen 10 is a plane screen portion in the curved screen, and the plane portion 11 is usually used as a main display area of the electronic device. The curved portion 12 of the curved screen 10 is a curved screen portion in the curved screen 10 located between the plane portion 11 and the housing 20. Generally, the curved portion 12 is a screen area covering a part or all side edges of the electronic device, and the second end of the curved portion 12 can move when receiving a target pressing operation.

The target pressing operation may be any pressing operation that can enable the second end of the curved portion 12 to move, and the pressing force, pressing position, and pressing direction, and the like of the pressing operation may be set according to actual needs. For example, the target pressing operation is a pressing operation for pressing along a preset pressing direction at a preset position of the curved portion 12, with the pressing force being greater than or equal to a preset pressing force, and so on.

In addition, in a case that the curved portion 12 receives the target pressing operation, the second end of the curved portion 12 moves. That is, on the premise that a display effect is not affected, the curved portion 12 is deformed by a force, so that a position of the second end of the curved portion 12 is changed, that is, movement is generated.

Figure 2:
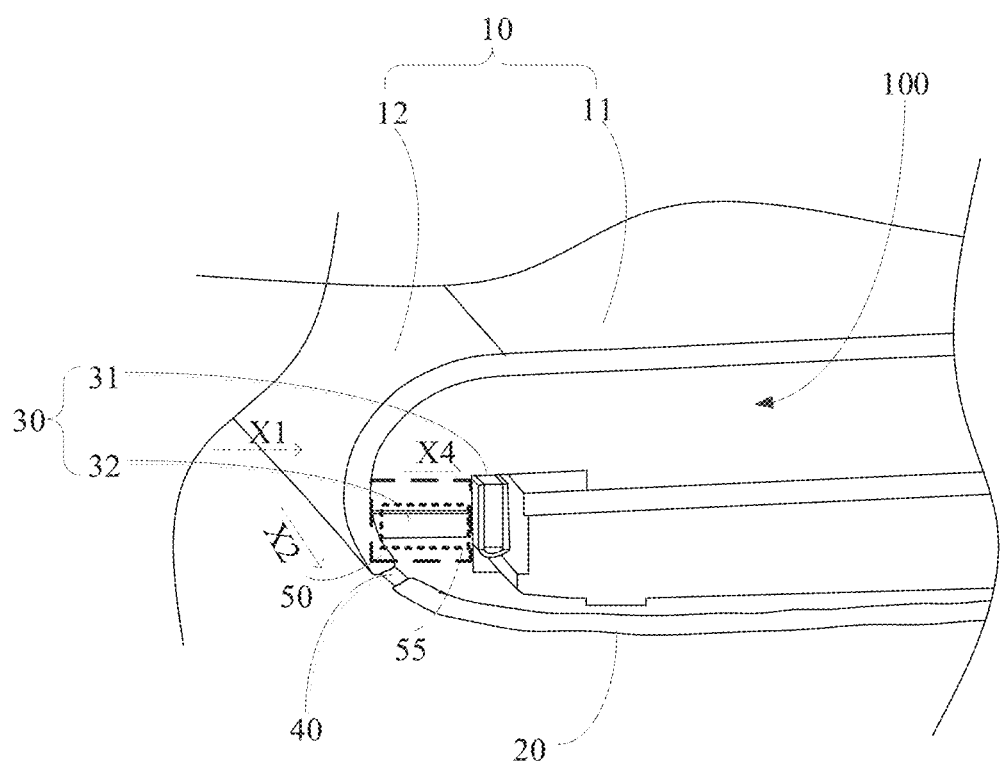
FIG. 2 is a second partial schematic structural diagram of an electronic device according to an embodiment of the present disclosure.

Exemplarily, as shown in FIG. 1 or FIG. 2, in a case that the curved portion 12 receives a pressing operation (that is, the target pressing operation) whose pressing direction is X1, the pressing operation has a component force in a direction X2, and the component force causes the curved portion 12 to be slightly deformed, so that an inclination angle for the second end of the curved portion (that is, a degree of curvature of the curved portion 12) is increased, or an angle between the curved portion 12 and the plane portion 11 is decreased, thereby causing the second end of the curved portion 12 to move toward a direction close to the housing 20.

In the foregoing example, the inclination angle for the second end of the curved portion 12 may be greater than or equal to 90° and less than or equal to 180°, thereby increasing the display area of the curved screen 10 and improving the display effect. In addition, as shown in FIG. 2, there may be a certain gap between the second end of the curved portion 12 and the housing 20, and an elastic sealing member 40 is disposed in the gap. In a case that the curved portion 12 is subject to the target pressing operation, the gap is reduced, so that the second end of the curved portion 12 can move easily and the sealing performance of the electronic device can be ensured.

In this embodiment, the first button 30 may be a physical function button that achieves a certain function of the electronic device. For example, the first button 30 may be a power button, a volume adjustment button, a shortcut operation button, or the like. In addition, the first button 30 includes the foregoing trigger assembly 32 and the foregoing pressure sensor 31.

The pressure sensor 31 is disposed in the accommodating cavity 100, and the pressure sensor is triggered when being subject to a certain pressure, so as to send a trigger signal to a processor of the electronic device, thereby achieving a function of the first button 30.

In addition, the trigger assembly 32 is disposed at the second end of the curved portion 12, and the trigger assembly 32 and the pressure sensor 31 are disposed at an interval. In a case that the curved portion 12 is subject to the target pressing operation, the trigger assembly 32 can be driven by the second end of the curved portion 12 to contact the pressure sensor 31, thereby triggering the pressure sensor 31.

It should be noted that the trigger assembly 32 is disposed at the second end of the curved portion 12, that is, the trigger assembly 32 and the second end of the curved portion 12 may be disposed at an interval, and when the second end of the curved portion 12 moves, the second end abuts against the trigger assembly 32 and drives the trigger assembly 32 to contact the pressure sensor 31. The trigger assembly 32 may also be connected to the second end of the curved portion 12, so that the second end of the curved portion 12 can more easily drive the trigger assembly 32 to contact the pressure sensor 31, thereby improving response sensitivity.

Definitely, for a setting relationship between the trigger assembly 32 and the second end of the curved portion 12, it is required that, in a case that the curved portion 12 receives the target pressing operation, the trigger assembly 32 can be driven by the second end of the curved portion 12 to contact pressure sensor 31, which is not limited herein.

In this embodiment, the trigger assembly 32 and the pressure sensor 31 are disposed at an interval, so that in a case that the curved screen 10 is not subject to the target pressing operation, there is a preset proper gap between the trigger assembly 32 and the pressure sensor 31, so as to further reduce the possibility of mis-operation. Here, the preset proper gap may be set according to actual needs.

In addition, in a case that the curved portion 12 receives the target pressing operation, the trigger assembly 32 may be any assembly that is driven by the second end of the curved portion 12 to contact the pressure sensor 31, thereby triggering the pressure sensor 31.

In some implementation manners, as shown in FIG. 2, the trigger assembly 32 is disposed in the accommodating cavity 100 and is located between the second end of the curved portion 12 and the pressure sensor 31.

In a case that the curved portion 12 receives the target pressing operation, the second end of the curved portion 12 drives the trigger assembly 32 to move toward the pressure sensor 31.

Here, the trigger assembly 32 is disposed in the accommodating cavity 100, and in a case that the curved portion 12 receives the target pressing operation, the second end of the curved portion 12 drives the trigger assembly to move toward the pressure sensor 31, which can not only achieve a function of the first button 30, but also improve concealment of the first button 30, which helps to expand a display area of the curved screen 10.

For example, as shown in FIG. 2, the trigger assembly 32 is a cylindrical thimble disposed in the accommodating cavity 100 and connected to the second end of the curved portion 12. In a case that the curved portion 12 receives a pressing operation in pressing direction X1, the curved portion 12 is subject to a component force in a direction X2, to cause an inclination angle to be increased, thereby driving the cylindrical thimble to move toward the pressure sensor 31 (that is, a direction X4), so that the cylindrical thimble can contact the pressure sensor 31 and then trigger the pressure sensor 31.

In some other implementation manners, as shown in FIG. 1, a first gap is disposed between the second end of the curved portion 12 and the housing 20, and the trigger assembly 32 is clamped in the first gap.

In a case that the curved screen 10 receives the target pressing operation, the second end of the curved portion moves toward the housing 20 and drives the trigger assembly 32, and the trigger assembly 32 contacts the pressure sensor 31, thereby triggering the pressure sensor 31.

Here, the trigger assembly 32 is clamped in a gap between the curved screen 10 and the housing 20, and when the second end of the curved portion 12 moves toward the housing 20, the trigger assembly 32 is driven to contact the pressure sensor 31, thereby causing the first button 30 to be disposed more flexibly.

In this implementation manner, the trigger assembly 32 is clamped in the first gap, that is, the second end of the curved portion 12 and an edge of the housing 20 may be provided with sliding grooves 50 relatively, and the trigger assembly 32 is provided with sliding rails 55 matching the second end of the curved portion 12 with sliding groove 50 of the housing 20. When the second end of the curved portion moves toward the housing 20, the trigger assembly 32 is squeezed to be driven, to contact the pressure sensor 31.

In some implementation manners, the trigger assembly 32 is an extendable assembly, and the extendable assembly extends toward the pressure sensor 31 when being squeezed.

Here, in a case that the trigger assembly 32 is squeezed, the trigger assembly 32 may extend toward the pressure sensor 31 and contact the pressure sensor 31, so that the trigger assembly 32 can move in a simpler manner.

The extendable assembly may be any assembly that extends toward the pressure sensor 31 when being squeezed.

In some implementation manners, the extendable assembly includes a driving portion (not shown) and an extension contact portion (not shown). The driving portion is disposed in the first gap, the extension contact portion is connected to the driving portion, and the extension contact portion and the pressure sensor 31 are disposed at an interval.

In a case that the driving portion is squeezed, the driving portion drives the extension contact portion to extend toward the pressure sensor 31 and contact the pressure sensor 31.

Here, the driving portion can drive, when being squeezed, the extension contact portion to extend toward the pressure sensor 31, so that the extension contact portion can contact the pressure sensor 31. Therefore, the trigger assembly 32 can move in a simple and reliable manner.

The driving portion may be any component that can provide a driving force for the extension contact portion according to a squeezing force that the driving portion is subject to. In some embodiments, the extendable assembly includes the driving portion and the extension contact portion. The driving portion is disposed in the first gap, the extension contact portion is connected to the driving portion, and the extension contact portion and the pressure sensor 31 are disposed at an interval. In a case that the driving portion is squeezed (that is, in a case that the second end of the curved portion moves toward the housing 20), the driving portion drives the extension contact portion to extend toward the pressure sensor 31 and contact the pressure sensor 31. Therefore, the trigger assembly 32 can work reliably and the reliability of the electronic device can be improved.

For example, the driving portion may include a pressure sensor and a lead screw stepping motor. In a case that the pressure sensor is squeezed, the pressure sensor transmits an electric signal to the lead screw stepping motor, and the lead screw stepping motor controls a screw (that is, the extension contact portion) connected to the lead screw stepping motor to be extended, and one end of the screw is enabled to contact the pressure sensor 31, and then the pressure sensor 31 is triggered.

In some implementation manners, the extendable assembly is an elastically deformable assembly. Therefore, in a case that the extendable assembly is subject to a pressing force, the extendable assembly can move and extend toward the pressure sensor 31, so that the trigger assembly 32 has a simple structure and can be implemented easily.

For example, as shown in FIG. 1, the elastically deformable assembly is disposed in a first gap between the second end of the curved portion 12 and the housing 20. In a case that the elastically deformable assembly is subject to a pressing force in a direction X2, the elastically deformable assembly is deformed by a torque force in a direction X3, so that the elastically deformable assembly extends toward a direction (that is, a direction X4) of the pressure sensor 31. The pressure sensor 31 is triggered when the elastically deformable assembly contacts the pressure sensor 31.

It should be noted that the extendable assembly is the elastically deformable assembly, and the extendable assembly may be made of any elastic material. For example, the extendable assembly may be an elastically deformable assembly made of a rubber material.

In addition, the trigger assembly 32 is clamped in the first gap between the curved screen 10 and the housing 20. That is, the trigger assembly 32 may be disposed to protrude relative to at least one of the curved screen 10 or the housing 20. In some implementation manners, a surface of the trigger assembly 32 far away from the accommodating cavity 100, an outer peripheral surface of the curved portion 12, and an outer peripheral surface of the housing 20 are in a same cambered surface, thereby improving the appearance beauty of the electronic device.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. An electronic device, comprising:
   a curved screen having a plane portion and a curved portion, the curved portion comprising a first end and a second end, wherein the second end comprises a first sliding groove;
   a housing comprising a second sliding groove, wherein the curved screen and the housing match to form an accommodating cavity; and
   a first button comprising a first pressure sensor disposed in the accommodating cavity and a trigger assembly disposed at an interval from the first pressure sensor, the trigger assembly comprising sliding rails and being clamped in a first gap between the second end of the curved portion and the housing by matching the sliding rails with the first and second sliding grooves,
   wherein the first end of the curved portion is connected to the plane portion;
      the second end of the curved portion is configured to extend toward the accommodating cavity; and
      when the curved portion receives a target pressing operation, the second end of the curved portion drives the trigger assembly to contact the first pressure sensor, thereby triggering the first pressure sensor.

2. The electronic device according to claim 1, wherein when the curved portion receives the target pressing operation, the second end of the curved portion moves toward the housing and drives the trigger assembly, and the trigger assembly contacts the first pressure sensor, thereby triggering the first pressure sensor.

3. The electronic device according to claim 1, wherein the trigger assembly is an extendable assembly, and the extendable assembly extends toward the first pressure sensor when being squeezed.

4. The electronic device according to claim 3, wherein the extendable assembly is an elastically deformable assembly.

5. The electronic device according to claim 3, wherein the extendable assembly comprises a driving portion and an extension contact portion, the driving portion is disposed in the first gap, the extension contact portion is connected to the driving portion, and the extension contact portion and the first pressure sensor are disposed at an interval, wherein when the driving portion is squeezed, the driving portion drives the extension contact portion to extend toward the first pressure sensor and contact the first pressure sensor.

6. The electronic device according to claim 5, wherein the driving portion comprises a second pressure sensor and a lead screw stepping motor, wherein the second pressure sensor is configured to, when being squeezed, transmit an electric signal to the lead screw stepping motor, causing the lead screw stepping motor to drive the extension contact portion to contact the first pressure sensor.

7. The electronic device according to claim 1, wherein a surface of the trigger assembly far away from the accommodating cavity, an outer peripheral surface of the curved portion, and an outer peripheral surface of the housing are on a same cambered surface.

8. The electronic device according to claim 1, wherein an inclination angle for the second end of the curved portion is greater than or equal to 90° and less than or equal to 180°.

* * * * *